US012810029B2

(12) United States Patent
Chen et al.

(10) Patent No.: US 12,810,029 B2
(45) Date of Patent: Nov. 24, 2026

(54) SYSTEM, METHOD, AND COMPUTER PROGRAM PRODUCT FOR PRIVACY-PRESERVED DATA SERVICES USING GENERATIVE AI ABSTRACTION

(71) Applicant: Visa International Service Association, San Francisco, CA (US)

(72) Inventors: Yuexi Chen, Foster City, CA (US); Ratna Deepthi Jarugu, Sunnyvale, CA (US); Sonia Gupta, Pleasanton, CA (US); Sunpreet Singh Arora, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 34 days.

(21) Appl. No.: 18/989,040

(22) Filed: Dec. 20, 2024

(65) Prior Publication Data

US 2025/0209206 A1 Jun. 26, 2025

Related U.S. Application Data

(60) Provisional application No. 63/613,228, filed on Dec. 21, 2023.

(51) Int. Cl.

| | |
|---|---|
| ***G06F 21/62*** | (2013.01) |
| ***H04L 67/306*** | (2022.01) |

(52) U.S. Cl.
CPC ........ *G06F 21/6254* (2013.01); *H04L 67/306* (2013.01)

(58) Field of Classification Search
CPC .......................... G06F 21/6254; H04L 67/306
See application file for complete search history.

(56) References Cited

U.S. PATENT DOCUMENTS 11,176,268 B1 * 11/2021 Kats ..................... H04L 63/102
2018/0063110 A1 * 3/2018 Kiryazov ............. H04L 63/104

* cited by examiner

*Primary Examiner* — Baotran N To
(74) *Attorney, Agent, or Firm* — The Webb Law Firm

(57) ABSTRACT

Systems, methods, and computer program products are provided for privacy-preserved data services using generative AI abstraction. The system includes at least one processor configured to generate a user profile based on identification data of a user by inputting the identification data to a generative machine learning model, generate abstracted datasets based on outputs of the generative machine learning model, and associate abstracted datasets with the user profile. The at least one processor is further configured to receive a request message from a third-party computing device comprising a query and a token associated with the user profile, determine the user profile based on the token, and generate outputs based on the query and the abstracted datasets associated with the user profile. The at least one processor is further configured to communicate a response message to the third-party computing device based on the outputs.

20 Claims, 13 Drawing Sheets

400

400

SYSTEM, METHOD, AND COMPUTER PROGRAM PRODUCT FOR PRIVACY-PRESERVED DATA SERVICES USING GENERATIVE AI ABSTRACTION

CROSS REFERENCE TO RELATED APPLICATION

The present application claims priority to U.S. Provisional Patent Application No. 63/613,228, filed on Dec. 21, 2023, the disclosure of which is hereby incorporated by reference in its entirety.

BACKGROUND

1. Technical Field

This disclosure relates generally to generative artificial intelligence (AI) and data privacy and, in some non-limiting embodiments or aspects, to systems, methods, and computer program products for privacy-preserved data services using generative AI abstraction.

2. Technical Considerations

Machine learning may refer to a field of computer science that uses statistical techniques to provide a computer system with the ability to learn (e.g., progressively improve performance of) a task with a given dataset. In some instances, a machine learning model may be created for a specific dataset so that the machine learning model may perform a task (e.g., a classification task) with regard to the dataset. Generative AI machine learning models may be trained to analyze patterns in data to generate similar patterns of data.

Currently, sensitive consumer data (e.g., user data) may be collected, processed, and/or stored by transaction service providers, third parties, and/or the like to improve relationships and/or interactions between consumers and various entities in an electronic payment processing network. The collection, processing, and storage of consumer data typically requires a great deal of computer resources (e.g., increased bandwidth for operation of security programs, larger memory for encrypted storage, increased processing capacity for security monitoring, additional network messaging for encryption and decryption processes, etc.) and compliance with restrictions in place to protect the consumer data. Moreover, a consumer may not consent to (or territories may disallow) the use of their consumer data for services and/or queries, which may prevent the provision of full services and/or system interoperability to the consumer.

SUMMARY

Accordingly, provided are improved systems, methods, and computer program products for privacy-preserved data services using generative artificial intelligence (AI) abstraction.

According to non-limiting embodiments or aspects, provided is a system for privacy-preserved data services using generative AI abstraction. An example system may include at least one processor configured to generate a user profile based on identification data of a user. In some non-limiting embodiments or aspects, when generating the user profile, the at least one processor may be configured to input the identification data to a generative machine learning model; generate a plurality of abstracted datasets based on a plurality of outputs of the generative machine learning model, each abstracted dataset of the plurality of abstracted datasets based on a diffuser of a plurality of diffusers, and each diffuser of the plurality of diffusers including a different set of hyperparameters defining how the generative machine learning model interprets the identification data to generate an output; and associate the plurality of abstracted datasets with the user profile. In some non-limiting embodiments or aspects, the at least one processor may be further configured to receive a request message from a third-party computing device, the request message including a query and a token, the token associated with the user profile. In some non-limiting embodiments or aspects, the at least one processor may be further configured to determine the user profile based on the token. In some non-limiting embodiments or aspects, the at least one processor may be further configured to generate a plurality of outputs based on the query and the plurality of abstracted datasets associated with the user profile. In some non-limiting embodiments or aspects, each output of the plurality of outputs may be based on an abstracted dataset of the plurality of abstracted datasets. In some non-limiting embodiments or aspects, the at least one processor may be further configured to communicate a response message to the third-party computing device based on the plurality of outputs.

In some non-limiting embodiments or aspects, when generating the user profile, the at least one processor may be configured to receive the identification data from a merchant system in response to the user scanning an identification device at a point-of-sale (POS) device.

In some non-limiting embodiments or aspects, when associating the plurality of abstracted datasets with the user profile, the at least one processor may be configured to store the plurality of abstracted datasets associated with the user profile in a database.

In some non-limiting embodiments or aspects, when determining the user profile based on the token, the at least one processor may be configured to, in response to receiving the token, query the database to retrieve the user profile based on the token.

In some non-limiting embodiments or aspects, the at least one processor may be further configured to determine at least one outlier output from the plurality of outputs, remove the at least one outlier output from the plurality of outputs, and normalize the plurality of outputs to provide a final output.

In some non-limiting embodiments or aspects, when communicating the response message to the third-party computing device based on the plurality of outputs, the at least one processor may be configured to communicate the response message to the third-party computing device based on the final output.

In some non-limiting embodiments or aspects, the at least one processor may be further configured to generate a confidence score associated with the final output. In some non-limiting embodiments or aspects, when communicating the response message to the third-party computing device based on the final output, the at least one processor may be configured to communicate the response message to the third-party computing device based on the final output, the response message including the confidence score.

According to non-limiting embodiments or aspects, provided is a computer-implemented method for privacy-preserved data services using generative AI abstraction. An example computer-implemented method may include generating, with at least one processor, a user profile based on identification data of a user. In some non-limiting embodiments or aspects, generating the user profile may include inputting the identification data to a generative machine learning model; generating a plurality of abstracted datasets based on a plurality of outputs of the generative machine learning model, each abstracted dataset of the plurality of abstracted datasets based on a diffuser of a plurality of diffusers, and each diffuser of the plurality of diffusers including a different set of hyperparameters defining how the generative machine learning model interprets the identification data to generate an output; and associating the plurality of abstracted datasets with the user profile. In some non-limiting embodiments or aspects, the method may include receiving, with at least one processor, a request message from a third-party computing device, the request message including a query and a token, the token associated with the user profile. In some non-limiting embodiments or aspects, the computer-implemented method may further include determining, with at least one processor, the user profile based on the token. In some non-limiting embodiments or aspects, the computer-implemented method may further include generating, with at least one processor, a plurality of outputs based on the query and the plurality of abstracted datasets associated with the user profile. In some non-limiting embodiments or aspects, each output of the plurality of outputs may be based on an abstracted dataset of the plurality of abstracted datasets. In some non-limiting embodiments or aspects, the computer-implemented method may include communicating, with at least one processor, a response message to the third-party computing device based on the plurality of outputs.

In some non-limiting embodiments or aspects, generating the user profile further may include receiving the identification data from a merchant system in response to the user scanning an identification device at a POS device.

In some non-limiting embodiments or aspects, associating the plurality of abstracted datasets with the user profile may include storing the plurality of abstracted datasets associated with the user profile in a database.

In some non-limiting embodiments or aspects, determining the user profile based on the token may include, in response to receiving the token, querying the database to retrieve the user profile based on the token.

In some non-limiting embodiments or aspects, the computer-implemented method may further include determining, with at least one processor, at least one outlier output from the plurality of outputs; removing, with at least one processor, the at least one outlier output from the plurality of outputs; and normalizing, with at least one processor, the plurality of outputs to provide a final output.

In some non-limiting embodiments or aspects, communicating the response message to the third-party computing device based on the plurality of outputs may include communicating the response message to the third-party computing device based on the final output.

In some non-limiting embodiments or aspects, the computer-implemented method may further include generating, with at least one processor, a confidence score associated with the final output. In some non-limiting embodiments or aspects, communicating the response message to the third-party computing device based on the final output may include communicating the response message to the third-party computing device based on the final output, the response message including the confidence score.

According to non-limiting embodiments or aspects, provided is a computer program product for privacy-preserved data services using generative AI abstraction. An example computer program product may include at least one non-transitory computer-readable medium which may include program instructions that, when executed by at least one processor, cause the at least one processor to generate a user profile based on identification data of a user. In some non-limiting embodiments or aspects, when generating the user profile, the instructions may cause the at least one processor to input the identification data to a generative machine learning model; generate a plurality of abstracted datasets based on a plurality of outputs of the generative machine learning model, each abstracted dataset of the plurality of abstracted datasets based on a diffuser of a plurality of diffusers, and each diffuser of the plurality of diffusers including a different set of hyperparameters defining how the generative machine learning model interprets the identification data to generate an output; and associate the plurality of abstracted datasets with the user profile. In some non-limiting embodiments or aspects, the instructions may further cause the at least one processor to receive a request message from a third-party computing device, the request message including a query and a token, the token associated with the user profile. In some non-limiting embodiments or aspects, the instructions may further cause the at least one processor to determine the user profile based on the token. In some non-limiting embodiments or aspects, the instructions may further cause the at least one processor to generate a plurality of outputs based on the query and the plurality of abstracted datasets associated with the user profile. In some non-limiting embodiments or aspects, each output of the plurality of outputs may be based on an abstracted dataset of the plurality of abstracted datasets. In some non-limiting embodiments or aspects, the instructions may further cause the at least one processor to communicate a response message to the third-party computing device based on the plurality of outputs.

In some non-limiting embodiments or aspects, when generating the user profile, the instructions may cause the at least one processor to receive the identification data from a merchant system in response to the user scanning an identification device at POS device.

In some non-limiting embodiments or aspects, when associating the plurality of abstracted datasets with the user profile, the instructions may cause the at least one processor to store the plurality of abstracted datasets associated with the user profile in a database.

In some non-limiting embodiments or aspects, when determining the user profile based on the token, the instructions may cause the at least one processor to, in response to receiving the token, query the database to retrieve the user profile based on the token.

In some non-limiting embodiments or aspects, the instructions may cause the at least one processor to determine at least one outlier output from the plurality of outputs, remove the at least one outlier output from the plurality of outputs, and normalize the plurality of outputs to provide a final output.

In some non-limiting embodiments or aspects, when communicating the response message to the third-party computing device based on the plurality of outputs, the instructions may cause the at least one processor to communicate the response message to the third-party computing device based on the final output.

In some non-limiting embodiments or aspects, the instructions may cause the at least one processor to generate a confidence score associated with the final output; where, when communicating the response message to the third-party computing device based on the final output, the instructions may cause the at least one processor to communicate the response message to the third-party computing device based on the final output, the response message including the confidence score.

Further non-limiting embodiments or aspects, are set forth in the following numbered clauses:

Clause 1: A system, comprising: at least one processor configured to: generate a user profile based on identification data of a user, wherein when generating the user profile, the at least one processor is configured to input the identification data to a generative machine learning model; generate a plurality of abstracted datasets based on a plurality of outputs of the generative machine learning model, each abstracted dataset of the plurality of abstracted datasets based on a diffuser of a plurality of diffusers, and each diffuser of the plurality of diffusers comprising a different set of hyperparameters defining how the generative machine learning model interprets the identification data to generate an output; and associate the plurality of abstracted datasets with the user profile; receive a request message from a third-party computing device, the request message comprising a query and a token, the token associated with the user profile; determine the user profile based on the token; generate a plurality of outputs based on the query and the plurality of abstracted datasets associated with the user profile, each output of the plurality of outputs based on an abstracted dataset of the plurality of abstracted datasets; and communicate a response message to the third-party computing device based on the plurality of outputs.

Clause 2: The system of clause 1, wherein, when generating the user profile, the at least one processor is configured to receive the identification data from a merchant system in response to the user scanning an identification device at a point-of-sale device.

Clause 3: The system of clause 1 or 2, wherein, when associating the plurality of abstracted datasets with the user profile, the at least one processor is configured to store the plurality of abstracted datasets associated with the user profile in a database.

Clause 4: The system of any of clauses 1-3, wherein, when determining the user profile based on the token, the at least one processor is configured to in response to receiving the token, query the database to retrieve the user profile based on the token.

Clause 5: The system of any of clauses 1-4, wherein the at least one processor is further configured to determine at least one outlier output from the plurality of outputs; remove the at least one outlier output from the plurality of outputs; and normalize the plurality of outputs to provide a final output.

Clause 6: The system of any of clauses 1-5, wherein, when communicating the response message to the third-party computing device based on the plurality of outputs, the at least one processor is configured to communicate the response message to the third-party computing device based on the final output.

Clause 7: The system of any of clauses 1-6, wherein the at least one processor is further configured to generate a confidence score associated with the final output; wherein, when communicating the response message to the third-party computing device based on the final output, the at least one processor is configured to communicate the response message to the third-party computing device based on the final output, the response message comprising the confidence score.

Clause 8: A computer-implemented method, comprising: generating, with at least one processor, a user profile based on identification data of a user, wherein generating the user profile comprises inputting the identification data to a generative machine learning model; generating a plurality of abstracted datasets based on a plurality of outputs of the generative machine learning model, each abstracted dataset of the plurality of abstracted datasets based on a diffuser of a plurality of diffusers, and each diffuser of the plurality of diffusers comprising a different set of hyperparameters defining how the generative machine learning model interprets the identification data to generate an output; and associating the plurality of abstracted datasets with the user profile; receiving, with at least one processor, a request message from a third-party computing device, the request message comprising a query and a token, the token associated with the user profile; determining, with at least one processor, the user profile based on the token; generating, with at least one processor, a plurality of outputs based on the query and the plurality of abstracted datasets associated with the user profile, each output of the plurality of outputs based on an abstracted dataset of the plurality of abstracted datasets; and communicating, with at least one processor, a response message to the third-party computing device based on the plurality of outputs.

Clause 9: The computer-implemented method of clause 8, wherein generating the user profile further comprises receiving the identification data from a merchant system in response to the user scanning an identification device at a point-of-sale device.

Clause 10: The computer-implemented method of clause 8 or 9, wherein associating the plurality of abstracted datasets with the user profile comprises storing the plurality of abstracted datasets associated with the user profile in a database.

Clause 11: The computer-implemented method of any of clauses 8-10, wherein determining the user profile based on the token comprises in response to receiving the token, querying the database to retrieve the user profile based on the token.

Clause 12: The computer-implemented method of any of clauses 8-11, further comprising determining, with at least one processor, at least one outlier output from the plurality of outputs; removing, with at least one processor, the at least one outlier output from the plurality of outputs; and normalizing, with at least one processor, the plurality of outputs to provide a final output.

Clause 13: The computer-implemented method of any of clauses 8-12, wherein communicating the response message to the third-party computing device based on the plurality of outputs comprises communicating the response message to the third-party computing device based on the final output.

Clause 14: The computer-implemented method of any of clauses 8-13, further comprising: generating, with at least one processor, a confidence score associated with the final output; wherein communicating the response message to the third-party computing device based on the final output comprises communicating the response message to the third-party computing device based on the final output, the response message comprising the confidence score.

Clause 15: A computer program product comprising a non-transitory computer readable medium comprising program instructions that, when executed by at least one processor, cause the at least one processor to: generate a user profile based on identification data of a user, wherein the program instructions that cause the at least one processor to generate the user profile cause the at least one processor to: input the identification data to a generative machine learning model; generate a plurality of abstracted datasets based on a plurality of outputs of the generative machine learning model, each abstracted dataset of the plurality of abstracted datasets based on a diffuser of a plurality of diffusers, and each diffuser of the plurality of diffusers comprising a different set of hyperparameters defining how the generative machine learning model interprets the identification data to generate an output; and associate the plurality of abstracted datasets with the user profile; receive a request message from a third-party computing device, the request message comprising a query and a token, the token associated with the user profile; determine the user profile based on the token; generate a plurality of outputs based on the query and the plurality of abstracted datasets associated with the user profile, each output of the plurality of outputs based on an abstracted dataset of the plurality of abstracted datasets; and communicate a response message to the third-party computing device based on the plurality of outputs.

Clause 16: The computer program product of clause 15, wherein the program instructions that cause the at least one processor to generate the user profile cause the at least one processor to receive the identification data from a merchant system in response to the user scanning an identification device at a point-of-sale device.

Clause 17: The computer program product of clause 15 or 16, wherein the program instructions that cause the at least one processor to associate the plurality of abstracted datasets with the user profile cause the at least one processor to store the plurality of abstracted datasets associated with the user profile in a database.

Clause 18: The computer program product of any of clauses 15-17, wherein the program instructions that cause the at least one processor to determine the user profile based on the token cause the at least one processor to in response to receiving the token, query the database to retrieve the user profile based on the token.

Clause 19: The computer program product of any of clauses 15-18, wherein the program instructions further cause the at least one processor to determine at least one outlier output from the plurality of outputs; remove the at least one outlier output from the plurality of outputs; and normalize the plurality of outputs to provide a final output.

Clause 20: The computer program product of any of clauses 15-19, wherein the program instructions that cause the at least one processor to communicate the response message to the third-party computing device based on the plurality of outputs cause the at least one processor to communicate the response message to the third-party computing device based on the final output.

Clause 21: The computer program product of any of clauses 15-20, wherein the program instructions further cause the at least one processor to generate a confidence score associated with the final output; wherein the program instructions that cause the at least one processor to communicate the response message to the third-party computing device based on the final output cause the at least one processor to communicate the response message to the third-party computing device based on the final output, the response message comprising the confidence score.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
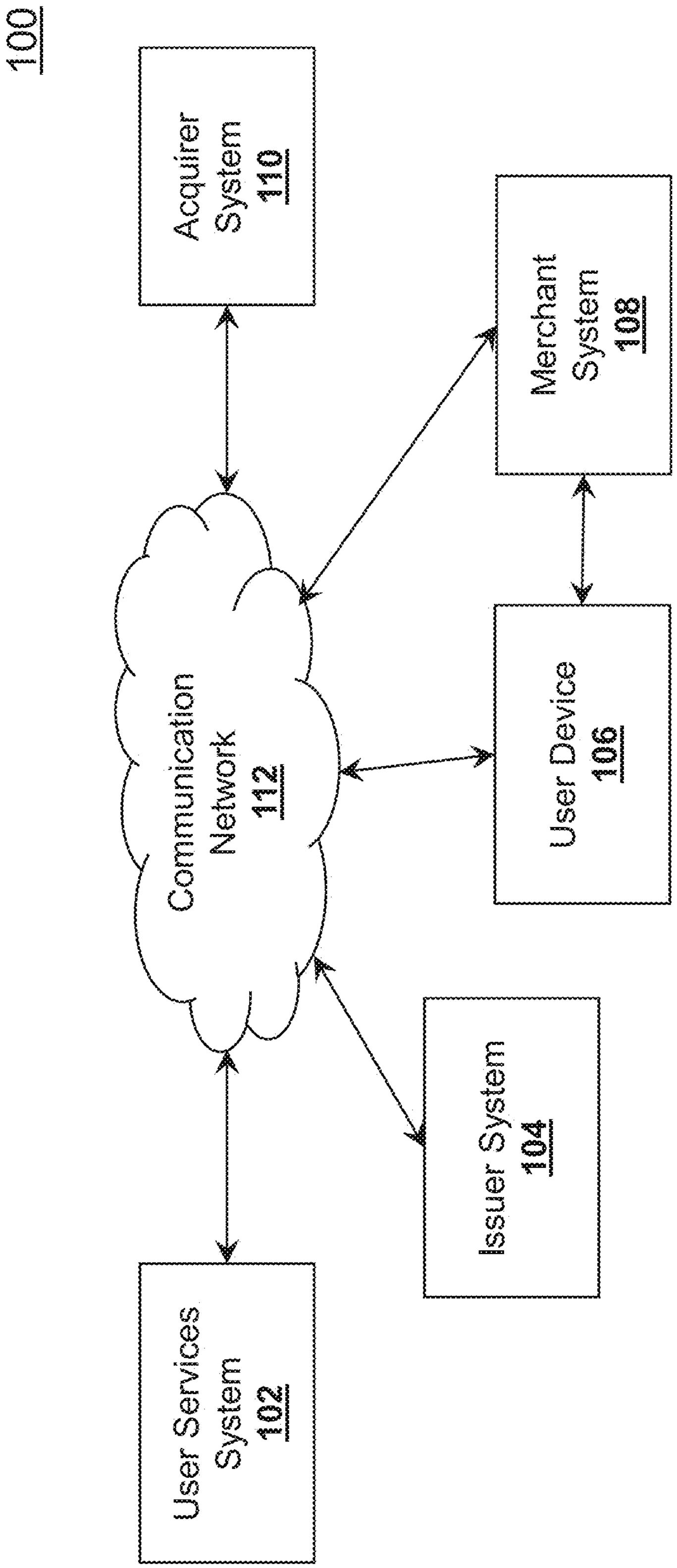
FIG. 1 is a schematic diagram of a system for privacy-preserved data services using generative artificial intelligence (AI) abstraction, according to some non-limiting embodiments or aspects.

For purposes of the description hereinafter, the terms “end,” “upper,” “lower,” “right,” “left,” “vertical,” “horizontal,” “top,” “bottom,” “lateral,” “longitudinal,” and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles “a” and “an” are intended to include one or more items and may be used interchangeably with “one or more” and “at least one.” Furthermore, as used herein, the term “set” is intended to include one or more items (e.g., related items, unrelated items, a combination of related and unrelated items, and/or the like) and may be used interchangeably with “one or more” or “at least one.” Where only one item is intended, the term “one” or similar language is used. Also, as used herein, the terms “has,” “have,” “having,” or the like are intended to be open-ended terms. Further, the phrase “based on” is intended to mean “based at least partially on” unless explicitly stated otherwise. In addition, reference to an action being “based on” a condition may refer to the action being “in response to” the condition. For example, the phrases “based on” and “in response to” may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Provided herein are systems, methods, and computer program products for privacy-preserved data services using generative artificial intelligence (AI) abstraction. Non-limiting embodiments or aspects of the present disclosure may include a system that includes at least one processor configured to generate a user profile (e.g., a dataset associated with and/or representative of historic data of a user) based on identification data (e.g., name, age, location, gender, personal preferences, transaction history, etc.) of a user (e.g., a cardholder, an account holder, a consumer, a service user, etc.). In some non-limiting embodiments or aspects, when generating the user profile, the at least one processor may be configured to input the identification data to a generative machine learning model (e.g., a model trained to produce a similar pattern of input data, a model trained to at least partly abstract the input data, etc.). In some non-limiting embodiments or aspects, when generating the user profile, the at least one processor may be configured to generate a plurality of abstracted datasets based on a plurality of outputs of the generative machine learning model, each abstracted dataset of the plurality of abstracted datasets based on a diffuser of a plurality of diffusers (e.g., generated using the diffuser, defined by the parameters of the diffuser, etc.), and each diffuser of the plurality of diffusers comprising a different set of hyperparameters defining how the generative machine learning model interprets the identification data to generate an output. In some non-limiting embodiments or aspects, when generating the user profile, the at least one processor may be configured to associate the plurality of abstracted datasets with the user profile (e.g., stored therein, referentially linked to, comprised by, etc.).

In some non-limiting embodiments or aspects, the at least one processor may be configured to receive a request message from a third-party computing device, the request message comprising a query (e.g., a search string, one or more parameters of a data retrieval request, and/or the like) and a token (e.g., a unique identifier, a public encryption key of a public-private key pair, etc.), the token associated with the user profile. In some non-limiting embodiments or aspects, the at least one processor may be configured to determine the user profile based on the token (e.g., using a search function, using a look-up table, and/or the like). In some non-limiting embodiments or aspects, the at least one processor may be configured to generate a plurality of outputs based on the query and the plurality of abstracted datasets associated with the user profile, each output of the plurality of outputs based on an abstracted dataset of the plurality of abstracted datasets (e.g., in substitution of querying actual user data). In some non-limiting embodiments or aspects, the at least one processor may be configured to communicate a response message to the third-party computing device based on the plurality of outputs (e.g., based on an aggregation, based on an average, based on a filtered subset, and/or the like).

In some non-limiting embodiments or aspects, when generating the user profile, the at least one processor may be configured to receive the identification data from a merchant system in response to the user scanning an identification device at the POS device.

In some non-limiting embodiments or aspects, when associating the plurality of abstracted datasets with the user profile, the at least one processor may be configured to store the plurality of abstracted datasets associated with the user profile in a database.

In some non-limiting embodiments or aspects, when determining the user profile based on the token, the at least one processor may be configured to query the database to retrieve the user profile based on the token in response to receiving the token.

In some non-limiting embodiments or aspects, the at least one processor may be further configured to determine at least one outlier output from the plurality of outputs, remove the at least one outlier output from the plurality of outputs, and normalize the plurality of outputs to provide a final output.

In some non-limiting embodiments or aspects, when communicating the response message to the third-party computing device based on the plurality of outputs, the at least one processor may be configured to: communicate the response message to the third-party computing device based on the final output.

In some non-limiting embodiments or aspects, the at least one processor may be further configured to generate a confidence score associated with the final output. In some non-limiting embodiments or aspects, when communicating the response message to the third-party computing device based on the final output, the at least one processor may be configured to communicate the response message to the third-party computing device based on the final output, the response message comprising the confidence score.

In this way, the present disclosure is directed to a system for providing user data to relying parties while protecting the privacy of the user. The system anonymizes user data by inputting the user data into a generative machine learning model to produce a plurality of abstracted datasets associated with the user data. A third-party computing device may query the system to request information about the user. The system may generate and provide the information about the user to the third-party computing device based on the abstracted datasets instead of actual user data, which preserves the privacy of the underlying user and removes the need for excess computing resources (e.g., processing capacity, bandwidth, memory storage space, etc.) to be expended on ongoing data privacy and security measures. In other words, an equal or higher level of privacy may be maintained for stored user data, due to abstraction, which directly results in fewer computing resources being employed as compared to known technical implementations. The system provides an improvement to fraud detection while also improving the protection of private user data. Additionally, feedback provided by the third-party computing device may be used to improve performance of the generative machine learning model, resulting in a self-improving feedback loop over subsequent time periods.

Referring now to FIG. 1, shown is a schematic diagram of a system 100 for privacy-preserved data services using generative AI abstraction, according to some non-limiting embodiments or aspects. As shown in FIG. 1, system 100 may include user services system 102, issuer system 104, user device 106, merchant system 108, acquirer system 110, and/or communication network 112. In some non-limiting embodiments or aspects, user services system 102, issuer system 104, user device 106, merchant system 108, and/or acquirer system 110 may interconnect (e.g., establish a connection to communicate) via wired connections, wireless connections (e.g., communication network 112) or a combination of wired and wireless connections.

User services system 102 may include one or more devices configured to communicate with issuer system 104, user device 106, merchant system 108, and/or acquirer system 110 (e.g., via a wired or wireless communication connection). For example, user services system 102 may include a server, a group of servers, and/or other like devices. In some non-limiting embodiments or aspects, user services system 102 may be associated with (e.g., included in a same system as) a transaction service provider system, as described herein. In some non-limiting embodiments or aspects, user services system 102 may be in communication with one or more data storage devices (e.g., databases not shown), which may be local or remote to user services system 102. In some non-limiting embodiments or aspects, user services system 102 may be capable of receiving information from, storing information in, transmitting information to, and/or searching information stored in the one or more data storage devices. In some non-limiting embodiments or aspects, user services system 102 may include at least one processor configured to generate (e.g., train, validate, retrain, and/or the like), store, and/or implement (e.g., operate, provide inputs to and/or outputs from, and/or the like) one or more machine learning models.

Issuer system 104 may include one or more devices configured to communicate with user services system 102, user device 106, merchant system 108, and/or acquirer system 110 (e.g., via a wired or wireless communication connection). For example, issuer system 104 may include a server, a group of servers, and/or other like devices. In some non-limiting embodiments or aspects, issuer system 104 may be associated with an issuer providing a transaction account for a user (e.g., a bank), as described herein. In some non-limiting embodiments or aspects, issuer system 104 may be in communication with one or more data storage devices (e.g., databases not shown), which may be local or remote to issuer system 104. In some non-limiting embodiments or aspects, issuer system 104 may be capable of receiving information from, storing information in, transmitting information to, and/or searching information stored in the one or more data storage devices.

User device 106 may include a computing device configured to communicate with user services system 102, issuer system 104, merchant system 108, and/or acquirer system 110 (e.g., via a wired or wireless communication connection). For example, user device 106 may include a computing device, such as a desktop computer, a portable computer (e.g., a tablet computer, a laptop computer, and/or the like), a mobile device (e.g., a cellular phone, a smartphone, a PDA, a wearable device, and/or the like), and/or other like devices. In some non-limiting embodiments or aspects, user device 106 may be associated with a user (e.g., an individual operating user device 106). For example, user device 106 may be associated with a user.

Merchant system 108 may include one or more devices configured to communicate with user services system 102, issuer system 104, user device 106, and/or acquirer system 110 (e.g., via a wired or wireless communication connection). Merchant system 108 may also include a device capable of receiving information from user device 106 via communication network 112, a communication connection (e.g., a near-field communication (NFC) communication connection, a radio frequency identification (RFID) communication connection, a Bluetooth® communication connection, a Zigbee® communication connection, and/or the like) with user device 106, and/or the like, and/or communicating information to user device 106 via communication network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to user services system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices configured to communicate with user services system 102, issuer system 104, user device 106, and/or merchant system 108 (e.g., via a wired or wireless communication connection). For example, acquirer system 110 may include a computing device, a server, a group of servers, and/or the like. In some non-limiting embodiments or aspects, acquirer system 110 may be associated with an acquirer as described herein. In some non-limiting embodiments or aspects, acquirer system 110 may be associated with an acquirer providing a transaction account for a merchant (e.g., a bank), as described herein.

Communication network 112 may include one or more wired and/or wireless networks. For example, communication network 112 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems and devices shown in FIG. 1 are provided as an example. There may be additional systems and/or devices, fewer systems and/or devices, different systems and/or devices, or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of system 100 may perform one or more functions described as being performed by another set of systems or another set of devices of system 100.

Figure 2:
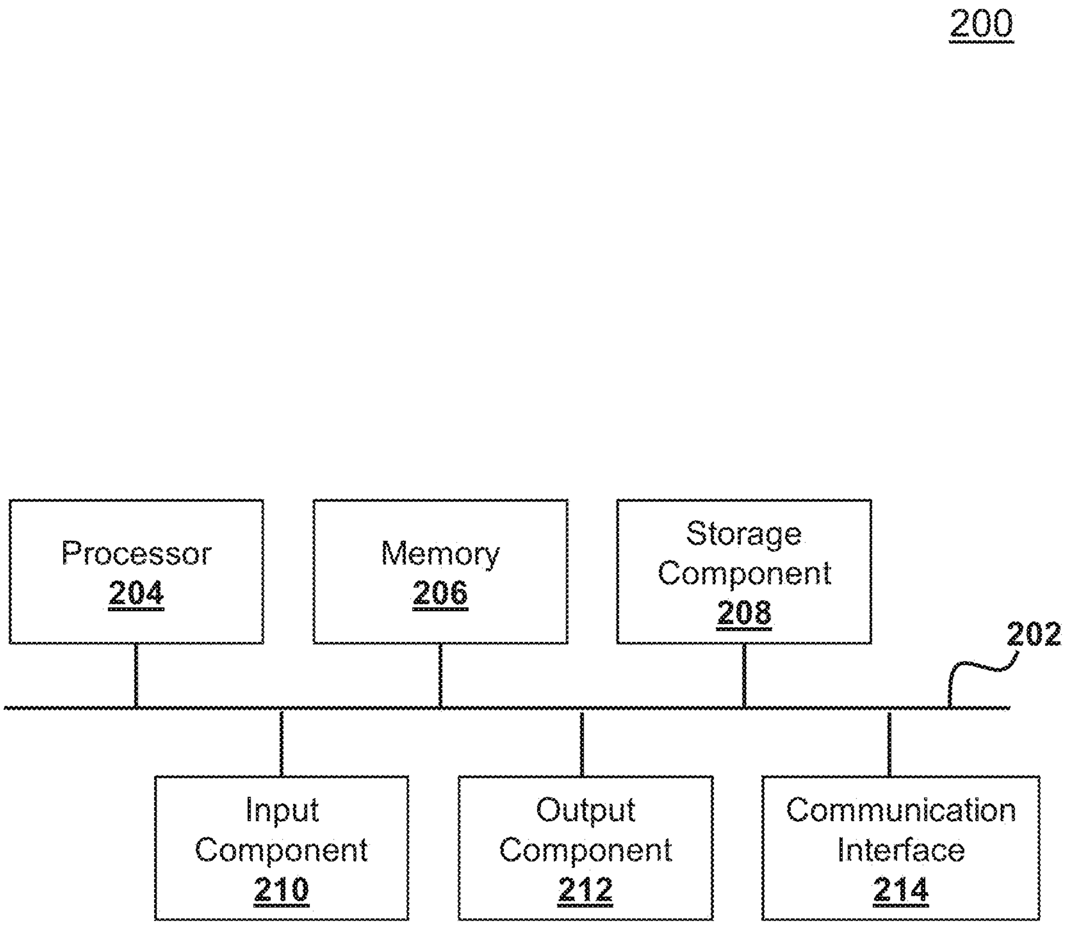
FIG. 2 is a schematic diagram of example components of one or more devices of FIG. 1, according to some non-limiting embodiments or aspects.

Referring now to FIG. 2, shown is a diagram of example components of a device 200, according to non-limiting embodiments. Device 200 may correspond to user services system 102, issuer system 104, user device 106, merchant system 108, and/or acquirer system 110, as an example. In some non-limiting embodiments or aspects, such systems or devices may include at least one device 200 and/or at least one component of device 200. The number and arrangement of components shown are provided as an example. In some non-limiting embodiments or aspects, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 3:
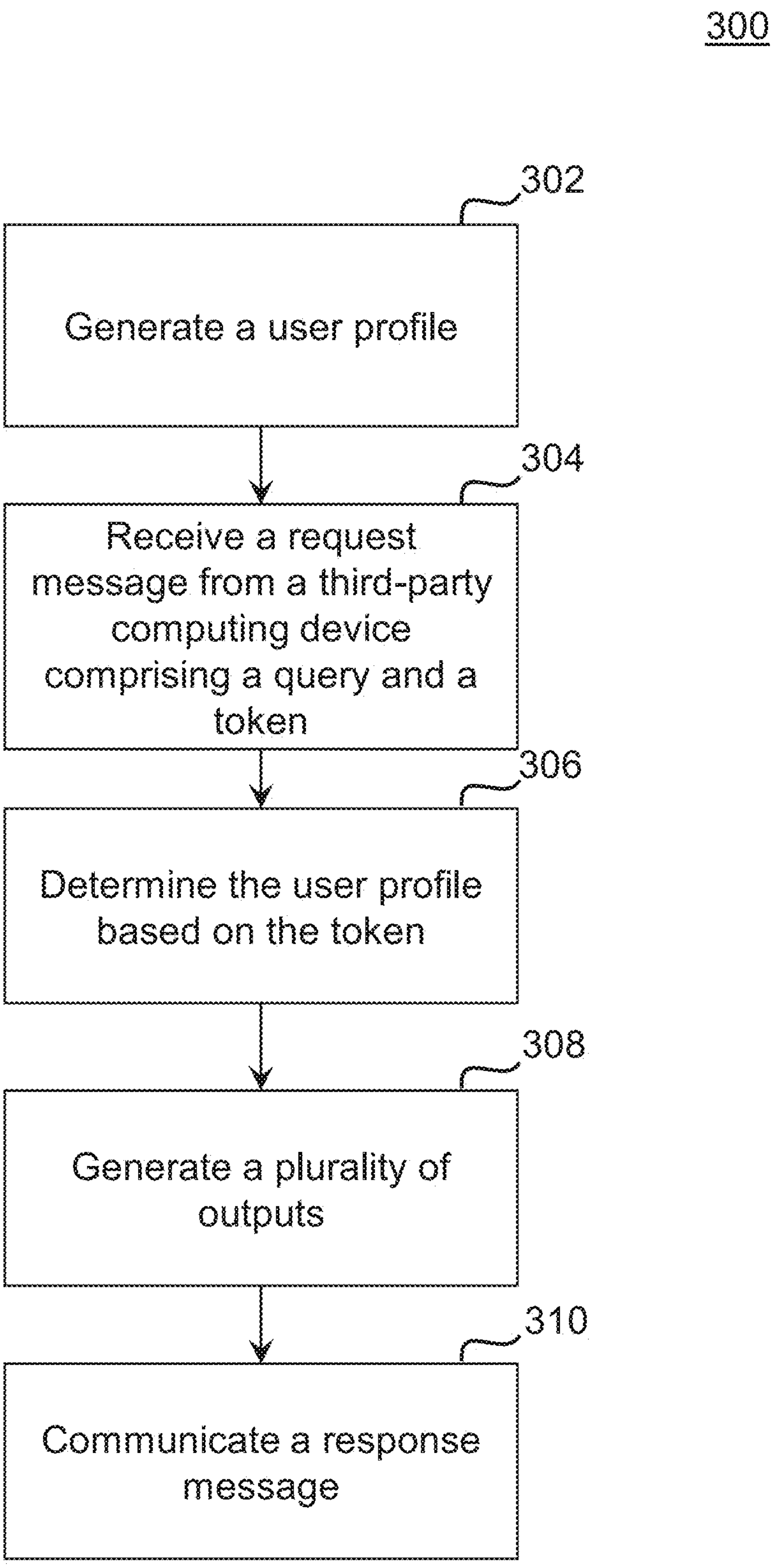
FIG. 3 is a flow diagram of a method for privacy-preserved data services using generative AI abstraction, according to some non-limiting embodiments or aspects.

Referring now to FIG. 3, shown is a flow diagram for a method 300 for privacy-preserved data services using generative AI abstraction, according to some non-limiting embodiments or aspects. The steps shown in FIG. 3 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step.

In some non-limiting embodiments or aspects, one or more steps of method 300 may be performed (e.g., completely, partially, etc.) by user services system 102 (e.g., one or more devices of user services system 102). In some non-limiting embodiments or aspects, one or more steps of method 300 may be performed (e.g., completely, partially, etc.) by another device or group of devices separate from or including user services system 102 (e.g., one or more devices of user services system 102), issuer system 104 (e.g., one or more devices of issuer system 104), user device 106, merchant system 108 (e.g., one or more devices of merchant system 108), and/or acquirer system 110 (e.g., one or more devices of acquirer system 110).

In some non-limiting embodiments or aspects, user services system 102 may receive identification data of a user from a third-party computing device. For example, user services system 102 may receive identification of a user from merchant system 108 in response to the user scanning an identification device at a POS device.

As shown in FIG. 3, at step 302, method 300 includes generating a user profile. For example, user services system 102 may generate a user profile in response to receiving the identification data from merchant system 108. In some non-limiting embodiments or aspects, user services system 102 may generate the user profile based on identification data of a user received from the user.

In some non-limiting embodiments or aspects, the identification data of the user may include data from an issued government identification (ID) (e.g., name, date of birth, address), electronic ID (e.g., eID) number, biometric data, consumer device serial number, payment card number, payment card personal account number, transaction data, and/or the like.

In some non-limiting embodiments or aspects, when generating the user profile, user services system 102 may input the identification data into a machine learning model (e.g., a generative machine learning model). In some non-limiting embodiments or aspects, user services system 102 may generate (e.g., train, validate, retrain, and/or the like), store, and/or implement (e.g., operate, provide inputs to and/or outputs from, and/or the like) the generative machine learning model. In some non-limiting embodiments or aspects, the generative machine learning model may include an input layer, an output layer, and one or more hidden layers. In some non-limiting embodiments or aspects, the generative machine learning model may be a trained machine learning model.

In some non-limiting embodiments or aspects, the generative machine learning model may provide a plurality of outputs. In some non-limiting embodiments or aspects, user services system 102 may generate a plurality of abstracted datasets based on the plurality of outputs. For example, when generating the user profile, user services system 102 may generate a plurality of abstracted datasets based on the plurality of outputs. Each abstracted dataset of the plurality of abstracted datasets may be based on a diffuser of a plurality of diffusers. Each diffuser of the plurality of diffusers may include a different set of hyperparameters defining how the generative machine learning model interprets the identification data to generate an output.

In some non-limiting embodiments or aspects, user services system 102 may associate the plurality of abstracted dataset with the user profile. For example, when generating the user profile, user services system 102 may associate the plurality of abstracted datasets with the user profile.

In some non-limiting embodiments or aspects, user services system 102 may store the plurality of abstracted datasets associated with the user profile in a database. In some non-limiting embodiments or aspects, user services system 102 may store the plurality of abstracted datasets associated with the user profile in a database in response to associating the plurality of abstracted datasets with the user profile.

In some non-limiting embodiments or aspects, the user may initiate a transaction with a merchant and be prompted to input identification data to a device of merchant system 108. In some non-limiting embodiments or aspects, upon receiving the identification data, merchant system 108 may generate a request message. The request message may include a query and/or a token. In some non-limiting embodiments or aspects, the query may include a question about the user. In some non-limiting embodiments or aspects, the token may include data associated with the user profile.

As shown in FIG. 3, at step 304, method 300 includes receiving a request message including the query and/or token from the third-party computing device. For example, user services system 102 may receive the request message from merchant system 108 comprising the query and/or the token.

In some non-limiting embodiments or aspects, user services system 102 may extract the token from the request message to determine the user profile. For example, user services system 102 may extract the token from the request message in response to receiving the request message.

As shown in FIG. 3, at step 306, method 300 includes determining the user profile based on the token. For example, user services system 102 may determine the user profile based on the token in response to receiving the request message and/or extracting the token from the request message.

As shown in FIG. 3, at step 308, method 300 includes generating a plurality of outputs. For example, user services system 102 may generate the plurality of outputs based on the query and/or the plurality of abstracted datasets associated with the user profile. In some non-limiting embodiments or aspects, each output of the plurality of outputs may be generated based on an abstracted dataset of the plurality of abstracted datasets.

In some non-limiting embodiments or aspects, user services system 102 may determine at least one outlier output from the plurality of outputs. For example, user services system 102 may determine at least one outlier output from the plurality of outputs in response to generating the plurality of outputs. User services system 102 may further remove the at least one outlier output from the plurality of outputs.

In some non-limiting embodiments or aspects, user services system 102 may normalize the plurality of outputs. For example, user services system 102 may normalize the plurality of outputs to provide a final output. The final output may include the plurality of outputs that has been normalized and has had one or more outlier outputs removed.

In some non-limiting embodiments or aspects, user services system 102 may generate a confidence score. For example, user services system 102 may generate a confidence score associated with the final output in response to normalizing the plurality of outputs and providing the final output.

In some non-limiting embodiments or aspects, user services system 102 may generate a response message. For example, user services system 102 may generate the response message based on the final output and/or the confidence score. In some non-limiting embodiments or aspects, the response message may include the final output and/or the confidence score.

As shown in FIG. 3, at step 310, method 300 includes communicating a response message. For example, user services system 102 may communicate the response message to the third-party computing device (e.g., one or more computing devices of merchant system 108) based on the plurality of outputs. In some non-limiting embodiments or aspects, user services system 102 may communicate the response message to the third-party computing device (e.g., one or more computing devices of merchant system 108) based on the final output and/or the confidence score.

Referring now to FIGS. 4A-4J, FIGS. 4A-4J are diagrams of non-limiting embodiments or aspects of an implementation 400 relating to a method (e.g., method 300) for privacy-preserved data services using generative AI abstraction, according to some non-limiting embodiments or aspects. In some non-limiting embodiments or aspects, one or more of the steps of the method may be performed (e.g., completely, partially, etc.) by user services system 102 (e.g., one or more devices of user services system 102). In some non-limiting embodiments or aspects, one or more steps of the method may be performed (e.g., completely, partially, etc.) by another device or group of devices separate from or includes user services system 102 (e.g., one or more devices of user services system 102), issuer system 104, user device 106, merchant system 108, and/or acquirer system 110.

In some non-limiting embodiments or aspects, a user may initiate a transaction with merchant system 108. For example, the user may initiate the transaction with a merchant by scanning an identification device associated with the user at a POS device of the merchant (not shown). The identification device may include a user device, a payment card, a virtual payment card, an identification card, a virtual identification card, etc.

In some non-limiting embodiments or aspects, the identification device may provide the identification data to the POS device in response to being scanned at the POS device. In some non-limiting embodiments or aspects, the identification data may include a plurality of features including a plurality of user identification features. The identification data may include a user's name, date of birth, address, electronic identification number, device serial number, payment card number, primary account number (PAN), and/or transaction details.

In some non-limiting embodiments or aspects, the merchant may generate and/or provide the identification data to user services system 102 in response to the identification device being scanned at the POS device.

Figure 4A:
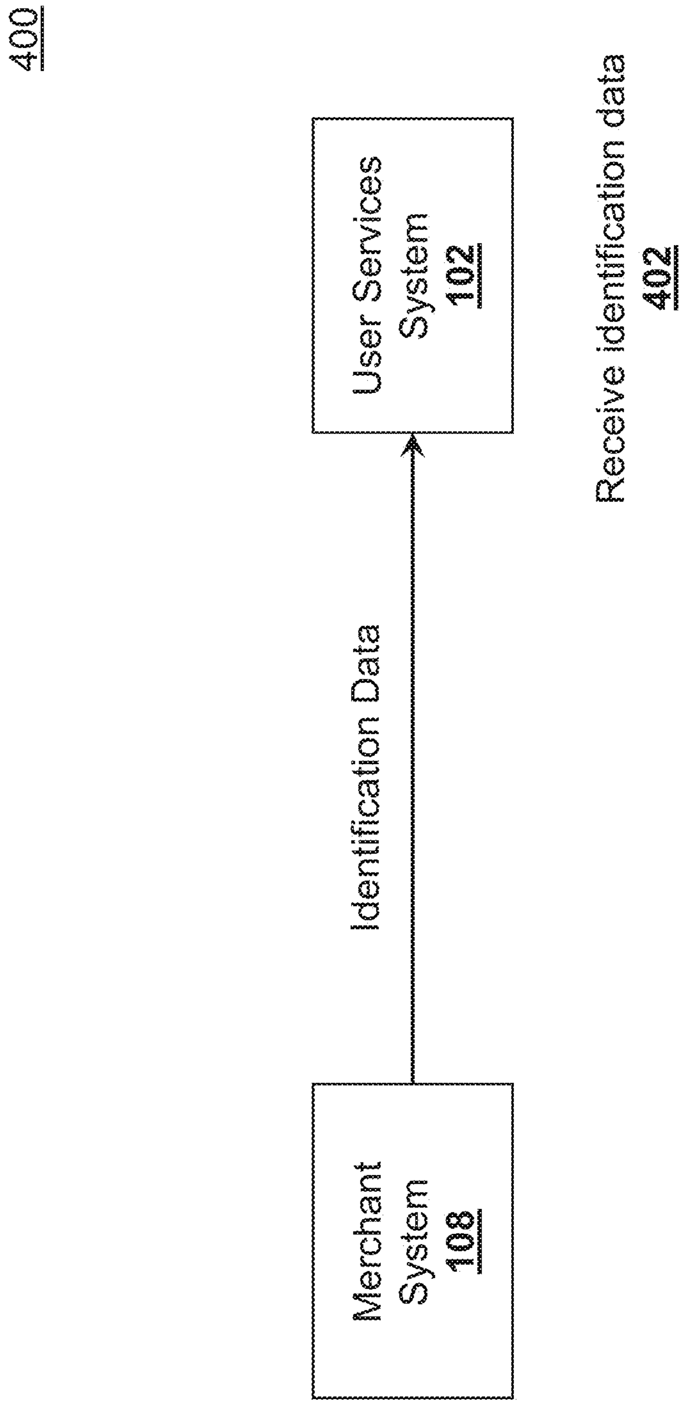
FIGS. 4A-4J are diagrams of a method for privacy-preserved data services using generative AI abstraction, according to some non-limiting embodiments or aspects.

As shown by reference number 402 in FIG. 4A, user services system 102 may receive identification data from the merchant (e.g., merchant system 108). For example, user services system 102 may receive identification data from the POS device of the merchant in response to the user scanning the identification device at the POS device.

In some non-limiting embodiments or aspects, user services system 102 may verify the identification data received from merchant system 108. For example, user services system 102 may verify the identification data with a third-party system (e.g., a chip authentication service system, a device attestation service system, a digital verification system, a country verifying certificate authority, system a document verifying certificate authority system, an identification verification service system, a biometric validation service system, and/or the like).

In some non-limiting embodiments or aspects, user servicers system 102 may anonymize the identification data received from merchant system 108 by removing one or more of the plurality of user identification features from the identification data to provide anonymized identification data. In some non-limiting embodiments or aspects, user services system 102 may store the anonymized identification data in a database (e.g., a database of user services system 102 and/or a database separate from user services system 102). In some non-limiting embodiments or aspects, the anonymized identification data may include an age group, an approximate geographic location, a device fingerprint, a financial instrument reference, user preferences, user habits, etc. In some non-limiting embodiments or aspects, user services system 102 anonymized the identification data to preserve the privacy of the user. In some non-limiting embodiments or aspects, the anonymization of the identification data cannot be reversed.

Figure 4B:
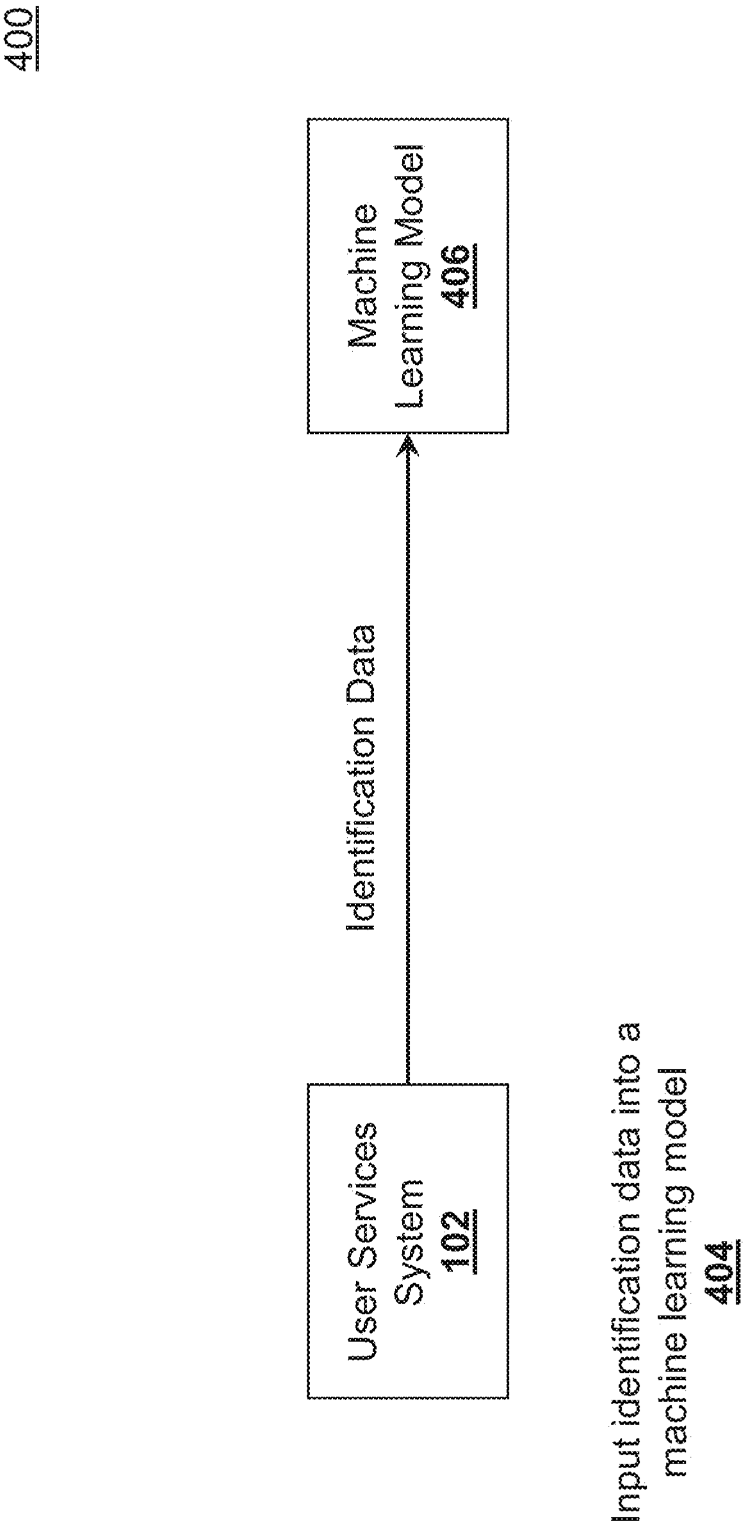

A shown by reference number 404 in FIG. 4B, user services system 102 may input the identification data (e.g., the anonymized identification data) to machine learning model 406. In some non-limiting embodiments or aspects, machine learning model 406 may be part of user services system 102. Alternatively, machine learning model 406 may be separate from user services system 102. In some non-limiting embodiments or aspects, machine learning model 406 may be a generative machine learning model, as described herein. In some non-limiting embodiments or aspects, user services system 102 may generate machine learning model 406, as described herein.

Figure 4C:
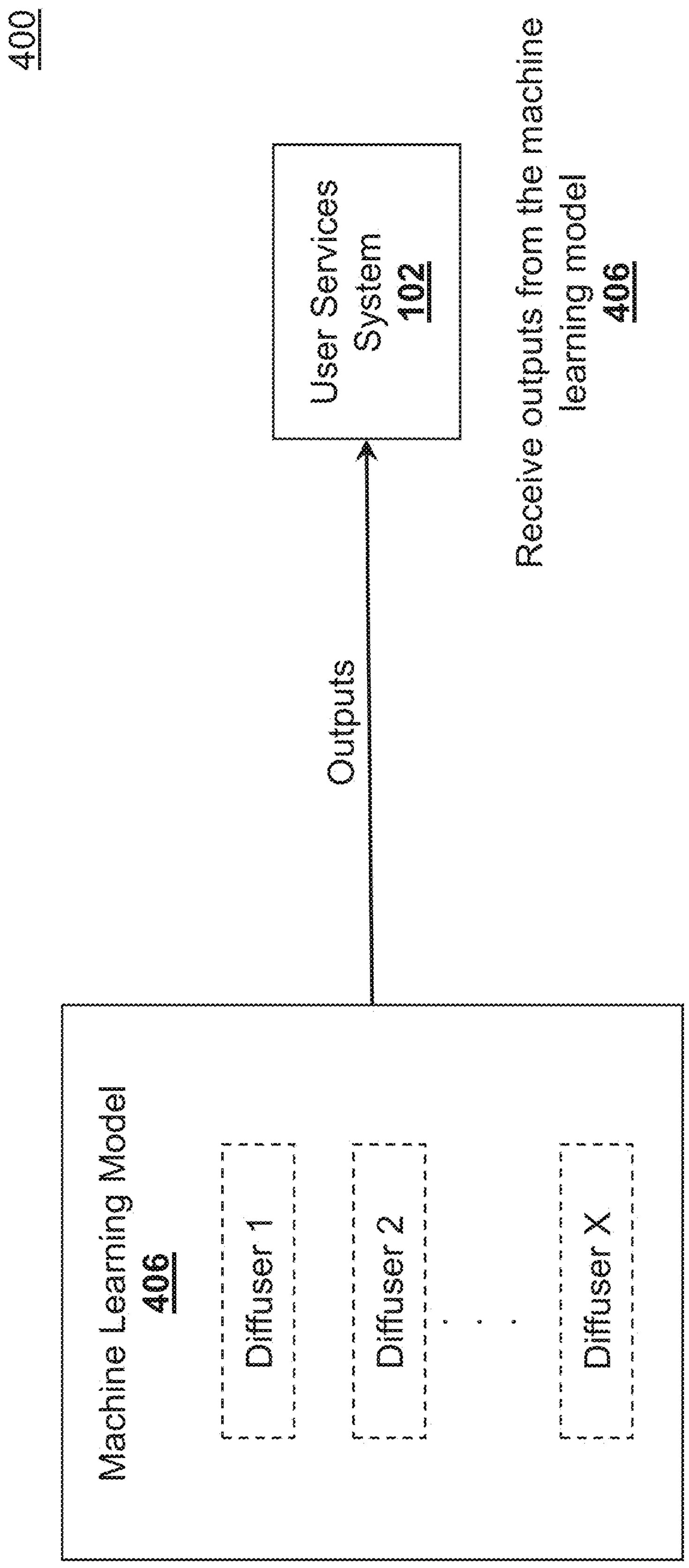

As shown by reference number 406 in FIG. 4C, user services system 102 may receive outputs from machine learning model 406.

In some non-limiting embodiments or aspects, machine learning model 406 may include a plurality of diffusers (e.g., diffuser 1, diffuser 2, diffuser X). In some non-limiting embodiments or aspects, each of the plurality of diffusers may include a different set of hyperparameters defining how machine learning model 406 interprets identification data (e.g., anonymized identification data) to generate an output.

In some non-limiting embodiments or aspects, the plurality of diffusers may include a plurality of user personas, a plurality of user perspectives, and/or one or more models with different weighted parameters.

In some non-limiting embodiments or aspects, in response to receiving the identification data, machine learning model 406 may generate and/or provide a plurality of outputs.

Figure 4D:
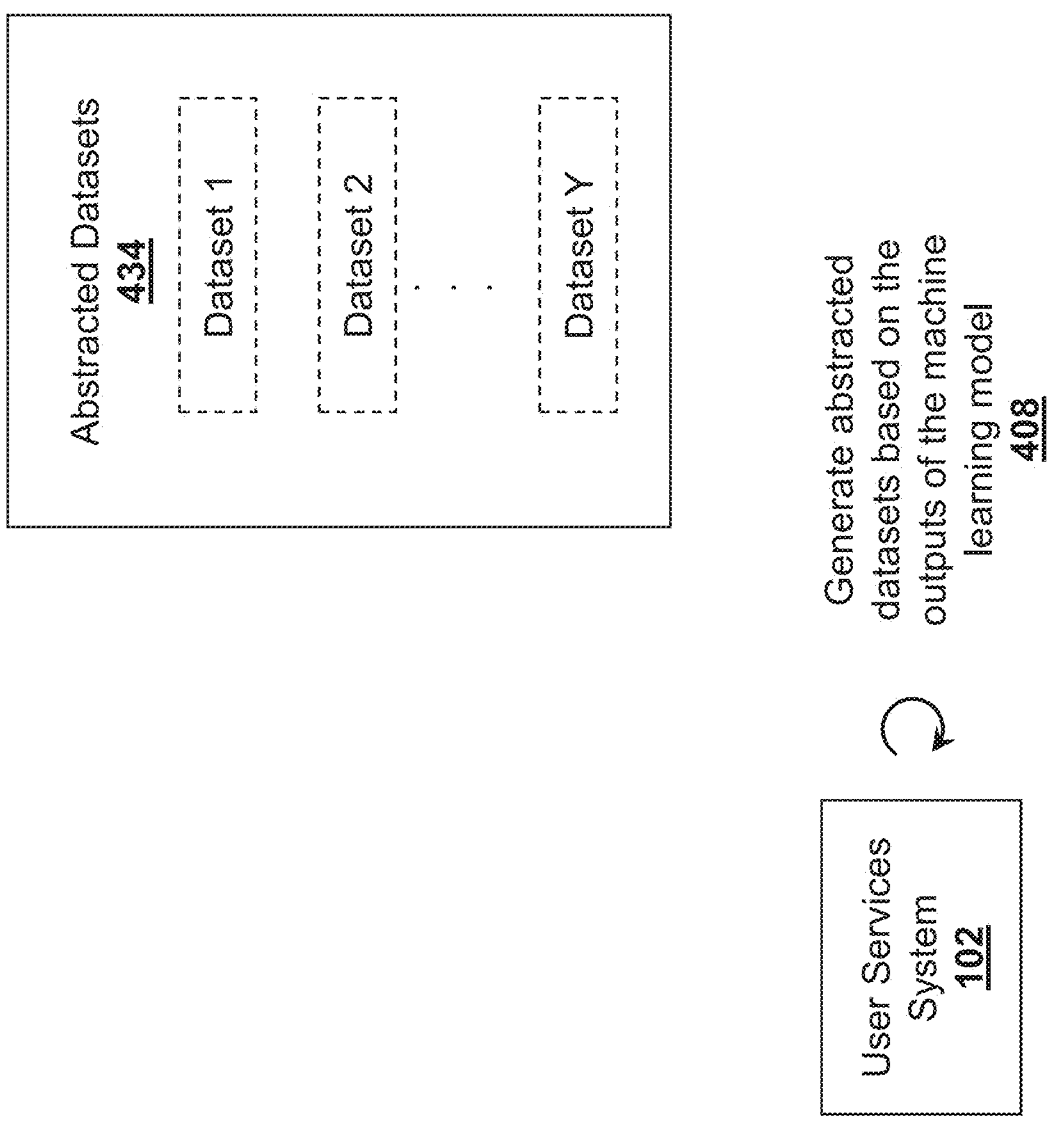

As shown by reference number 408 in FIG. 4D, user services system 102 may generate abstracted datasets based on the outputs of the machine learning model. For example, user service system 102 may generate the plurality of abstracted datasets 434 in response to receiving the outputs from machine learning model 406.

In some non-limiting embodiments or aspects, each abstracted dataset of the plurality of abstracted datasets 434 (e.g., dataset 1, dataset 2, dataset Y) may be based on a diffuser of the plurality of diffusers.

Figure 4E:
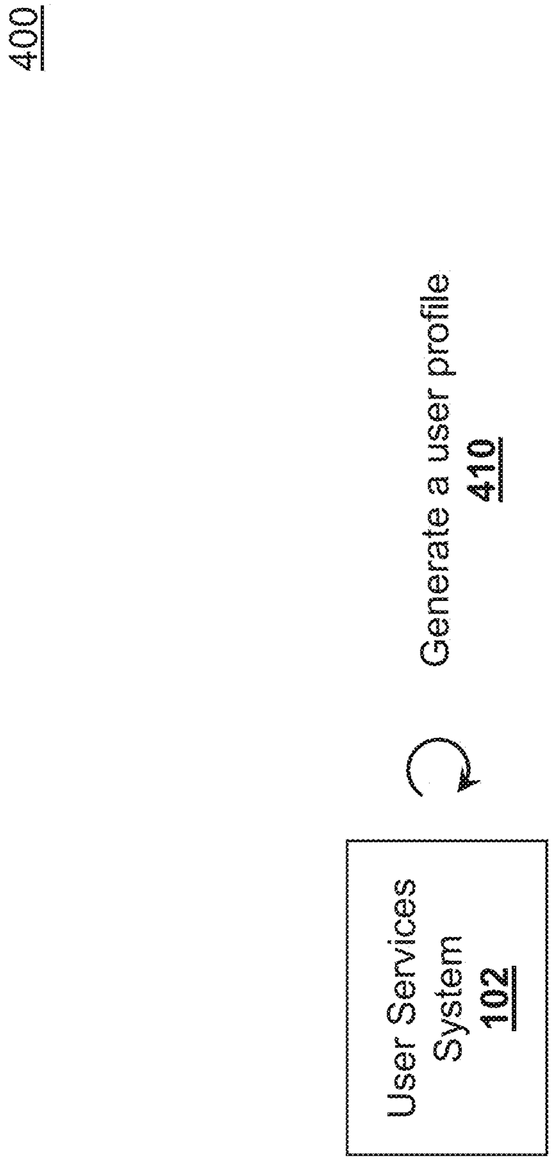

As shown by reference number 410 in FIG. 4E, user services system 102 may generate a user profile. For example, user services system 102 may generate the user profile associated with the user based on the plurality of abstracted datasets (e.g, abstracted datasets 434).

Figure 4F:
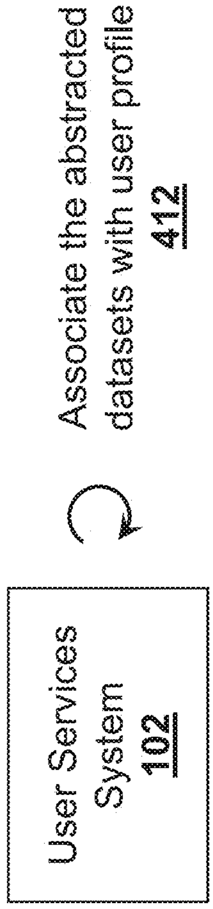

As shown by reference number 412 in FIG. 4F, user services system 102 may associate the abstracted datasets (e.g., abstracted datasets 434) with the user profile.

Figure 4G:
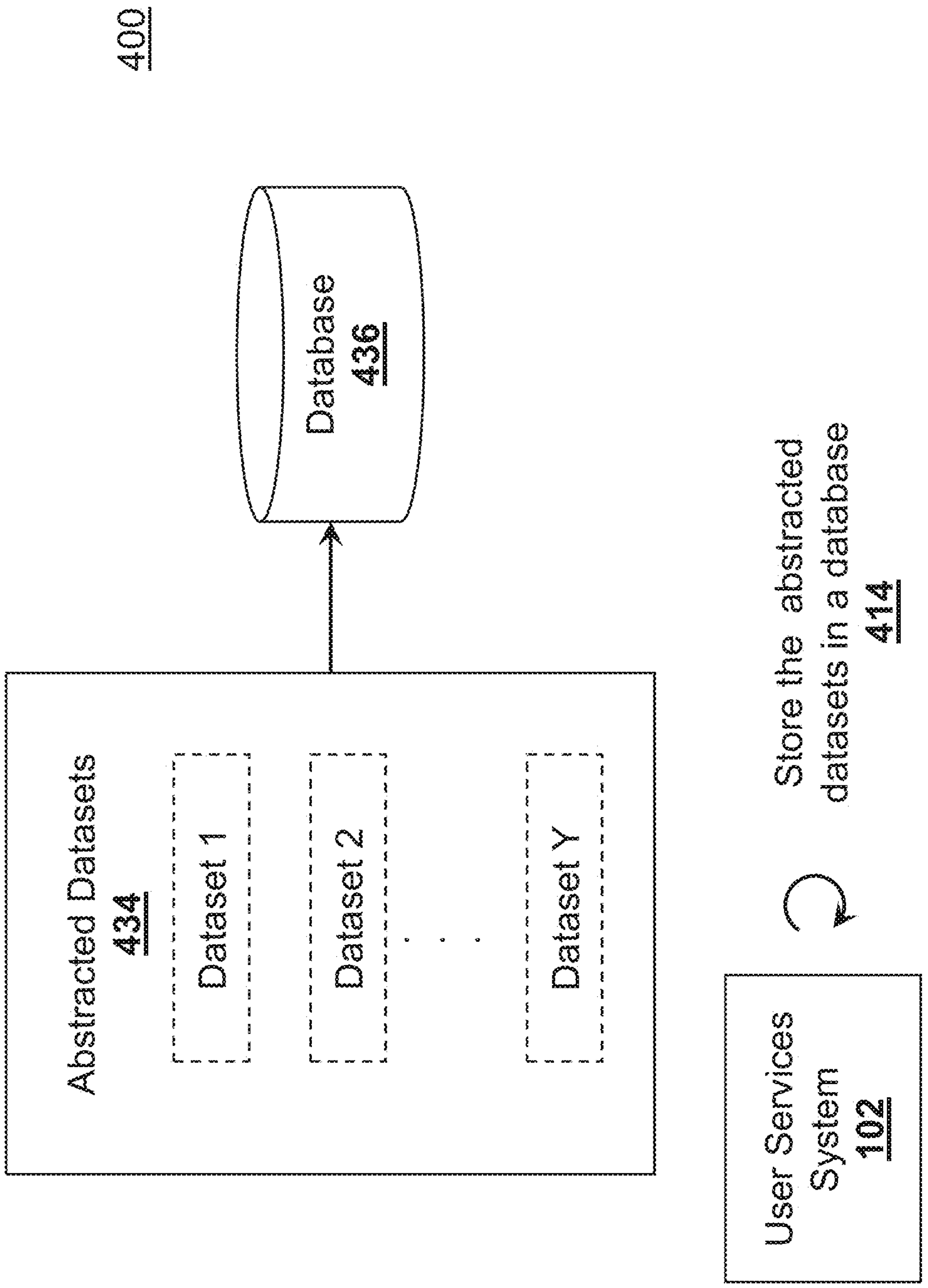

As shown by reference number 414 in FIG. 4G, user services system 102 may store the abstracted datasets 434 in database 436. In some non-limiting embodiments or aspects, database 436 may be part of user services system 102. In some non-limiting embodiments or aspects, database 436 may be separate from user services system 102.

Figure 4H:
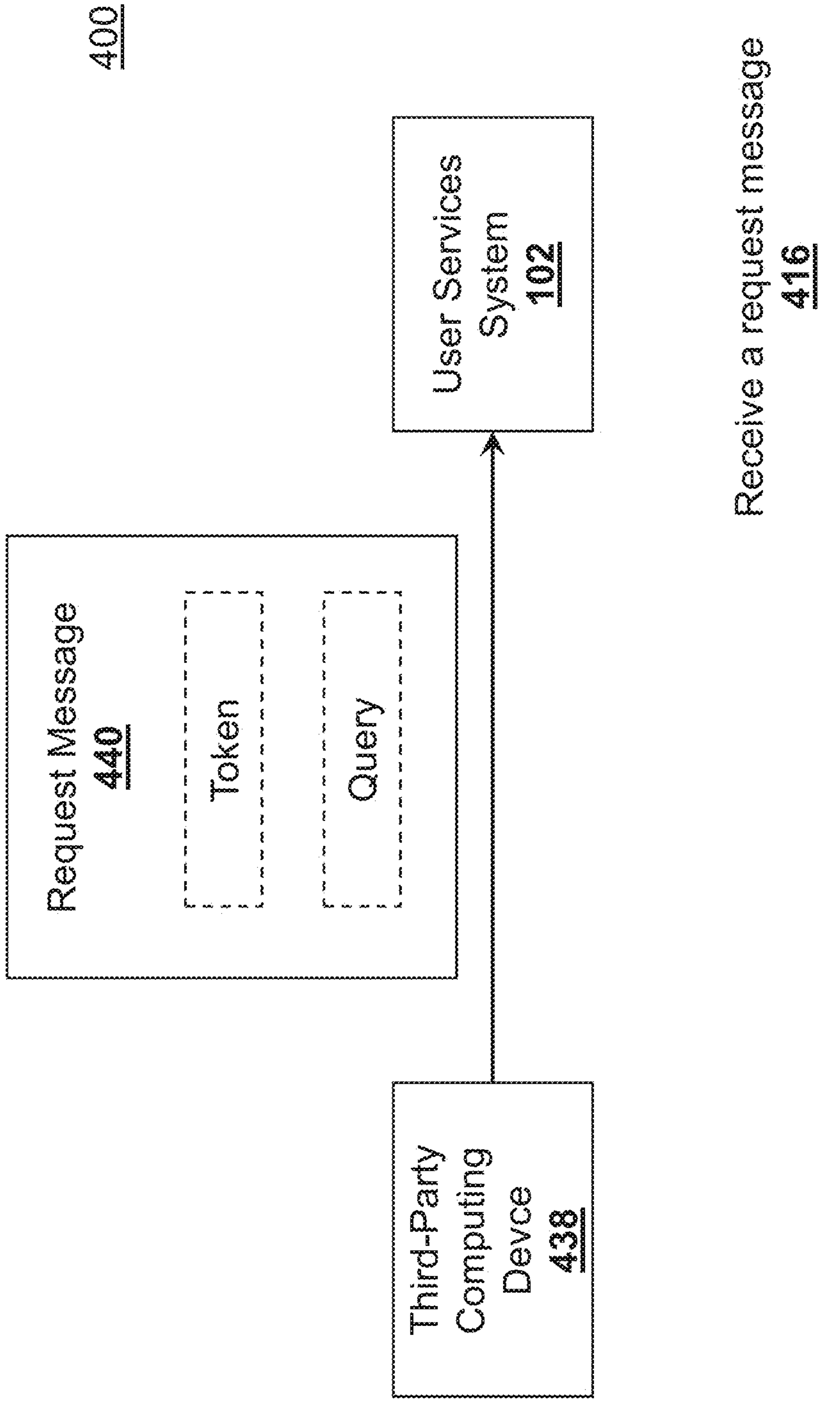

As shown by reference number 416 in FIG. 4H, user services system 102 may receive a request message 440. For example, user services system 102 may receive the request message from a third-party computing device 438 (e.g., one or more computing devices of an issuer system, a merchant system, and/or an acquirer system).

In some non-limiting embodiments or aspects, the request message 440 may include a token and/or a query. In some non-limiting embodiments or aspects, the token may be a target reference and/or a user identification. In some non-limiting embodiments or aspects, the query may include a question associated with the target reference (e.g., the user associated with the user profile) and/or the user identification. In some non-limiting embodiments or aspects, the query may be an eligibility check (e.g., for the purchase of alcohol, a senior citizen discount, etc.). For example, the query may ask, "is the target reference over the age of 21?" In some non-limiting embodiments or aspects, the query may be a behavioral pattern check (e.g., how many returns, cancellations, charge backs, fraudulent charges, authorizations, declines, etc., have occurred for the target reference?). In some non-limiting embodiments or aspects, the behavioral pattern check may be performed across all payment credentials owned by the user.

Figure 4I:
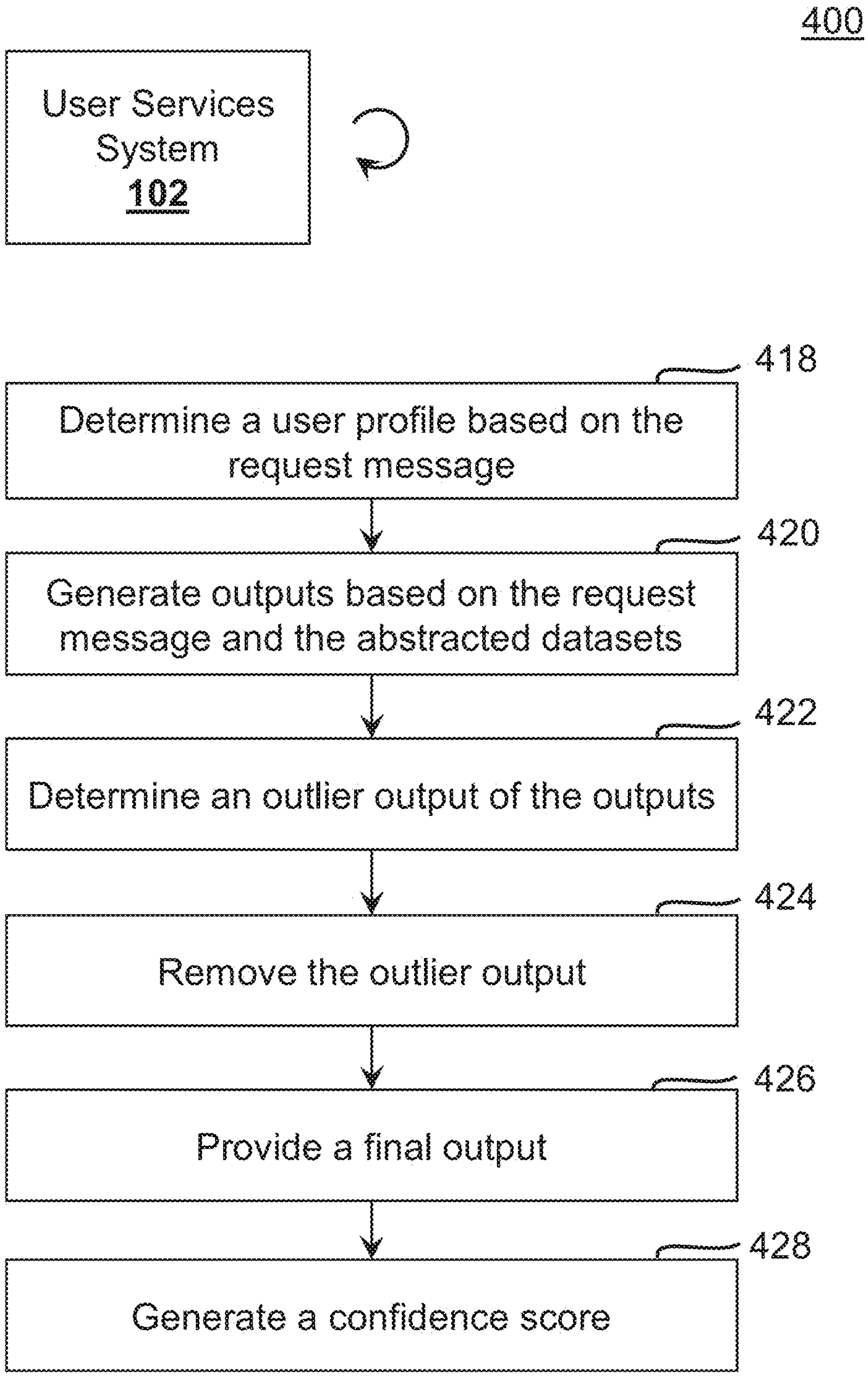

As shown by reference number 418 in FIG. 4I, user services system 102 may determine a user profile based on the request message. For example, user services system 102 may determine the user profile based on the request message including the token.

In some non-limiting embodiments or aspects, user services system 102 may query a database to retrieve a user profile based on the token. For example, in response to receiving the request message including the token, user services system 102 may query dataset 436 to retrieve the user profile.

As shown by reference number 420 in FIG. 4I, user services system 102 may generate outputs based on the request message and the abstracted datasets. For example, user services system 102 may generate a plurality of outputs based on the query and the plurality of abstracted datasets associated with the user profile. In some non-limiting embodiments or aspects, each of the plurality of outputs may be generated based on an abstracted dataset of the plurality of abstracted datasets.

As shown by reference number 422 in FIG. 4I, user services system 102 may determine an outlier output of the outputs. For example, user services system 102 may determine at least one outlier output from the plurality of outputs. In some non-limiting embodiments or aspects, user services system 102 may determine whether each output of the plurality of outputs satisfies a threshold value. In some non-limiting embodiments or aspects, if an output satisfies the threshold value, user services system 102 may determine that the output is an outlier output. In some non-limiting embodiments or aspects, user services system 102 may determine an outlier output of the plurality of outputs based on calculating a z-score and/or an interquartile range of the outputs.

As shown by reference number 424 in FIG. 4I, user services system 102 may remove the outlier output. For example, if user services system 102 determines than an output of the plurality of outputs is an outlier output, user services system 102 may remove the outlier output from the plurality of outputs to provide a remaining plurality of outputs (e.g., the plurality of outputs less the outlier output).

In some non-limiting embodiments or aspects, user services system 102 may normalize the plurality of outputs and/or the remaining plurality of outputs.

As shown by reference number 426 in FIG. 4I, user services system 102 may provide a final output. For example, user services system 102 may provide a final output based on normalizing the plurality of outputs and/or the remaining plurality of outputs. In some non-limiting embodiments or aspects, the final output may include a response to the query (e.g., query: "Is the target reference over the age of 21?"; final output "Yes").

As shown by reference number 428 in FIG. 4I, user services system 102 may generate a confidence score. For example, user service system 102 may generate a confidence score associated with the final output. In some non-limiting embodiments or aspects, the confidence score may include a percentage value indicating a likelihood of the correctness of the response to the query (e.g., query: "Is the target reference over the age of 21?"; final output "Yes"; confidence score "100%").

In some non-limiting embodiments or aspects, user services system 102 may generate a response message. The response message may include the plurality of outputs, the remaining plurality of outputs, the final output, the confidence score, and/or the identification data (e.g., anonymized identification data).

Figure 4J:
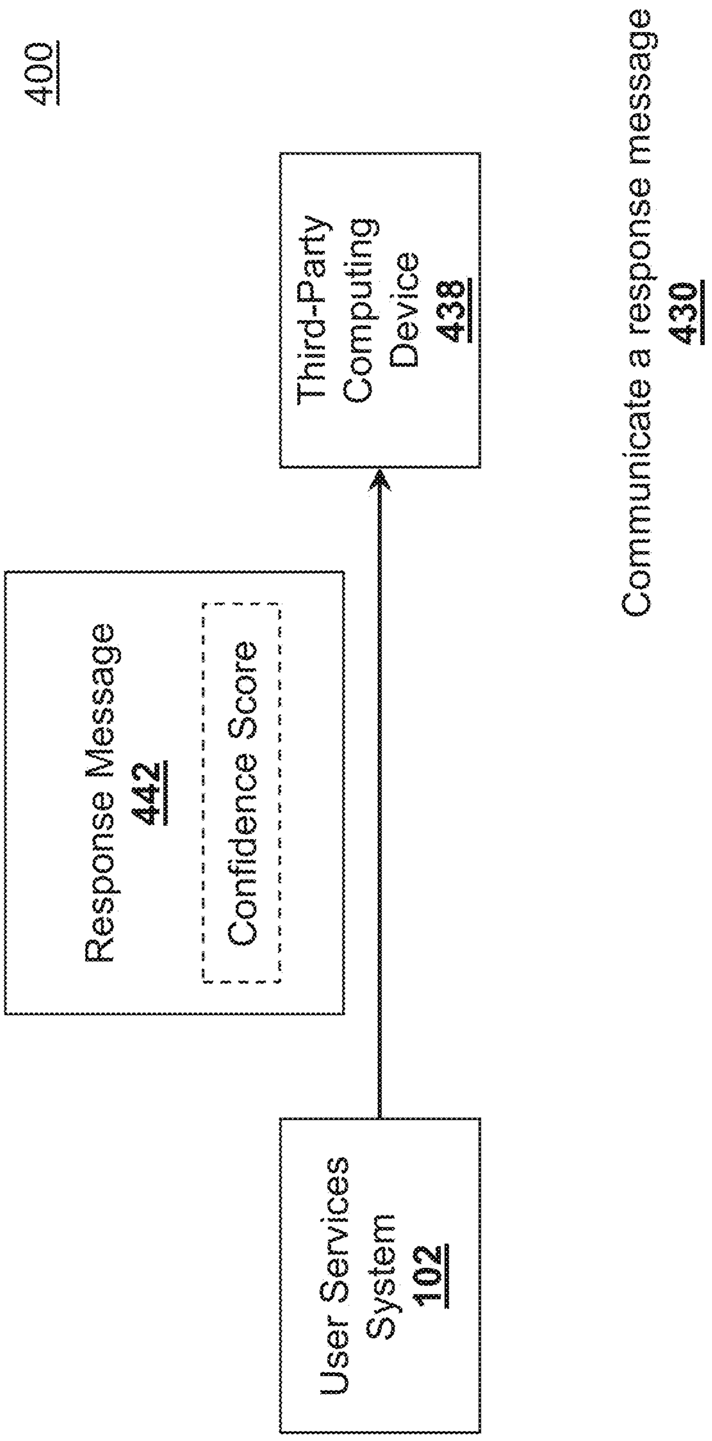

As shown by reference number 430 in FIG. 4J, user services system 102 may communicate response message 442 to third-party computing device 438 (e.g., including one or more third-party computing devices). For example, user services system 102 may communicate response message 442 to third-party system 438 based on the plurality of outputs. In some non-limiting embodiments or aspects, user services system 102 may communicate response message 442, including the confidence score, to third-party system 438 based on the final output.

In some non-limiting embodiments or aspects, third-party system 438 may approve and/or deny the transaction with the user based on the response message and/or the confidence score. For example, if the user initiates a transaction for the purchase of alcohol and the query is an eligibility check asking if the user is above the age of 21 and the response to the query is "Yes" and the confidence score satisfies a threshold value, the transaction may be approved. If the confidence score does not satisfy the threshold value, the transaction may be denied. In some non-limiting embodiments or aspects, if the query is a behavioral check asking if the likelihood of fraud is high and the response to the query is "Yes" and the confidence score satisfies the threshold value, the transaction may be denied.

In some non-limiting embodiments or aspects, in response to receiving response message 442, third-party system 438 may store response message 442 in a database (not shown).

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:

at least one hardware processor configured to:

generate a user profile based on identification data of a user, wherein when generating the user profile, the at least one hardware processor is configured to:

input the identification data to a generative machine learning model;

generate a plurality of abstracted datasets based on a plurality of outputs of the generative machine learning model, each abstracted dataset of the plurality of abstracted datasets based on a diffuser of a plurality of diffusers, and each diffuser of the plurality of diffusers comprising a different set of hyperparameters defining how the generative machine learning model interprets the identification data to generate an output; and associate the plurality of abstracted datasets with the user profile;

receive a request message from a third-party computing device, the request message comprising a query and a token, the token associated with the user profile;

determine the user profile based on the token;

generate a plurality of outputs based on the query and the plurality of abstracted datasets associated with the user profile, each output of the plurality of outputs based on an abstracted dataset of the plurality of abstracted datasets; and communicate a response message to the third-party computing device based on the plurality of outputs.

2. The system of claim 1, wherein, when generating the user profile, the at least one hardware processor is configured to:

receive the identification data from a merchant system in response to the user scanning an identification device at a point-of-sale device.

3. The system of claim 1, wherein, when associating the plurality of abstracted datasets with the user profile, the at least one hardware processor is configured to:

store the plurality of abstracted datasets associated with the user profile in a database.

4. The system of claim 3, wherein, when determining the user profile based on the token, the at least one hardware processor is configured to:

in response to receiving the token, query the database to retrieve the user profile based on the token.

5. The system of claim 1, wherein the at least one hardware processor is further configured to:

determine at least one outlier output from the plurality of outputs;

remove the at least one outlier output from the plurality of outputs; and normalize the plurality of outputs to provide a final output.

6. The system of claim 5, wherein, when communicating the response message to the third-party computing device based on the plurality of outputs, the at least one hardware processor is configured to:

communicate the response message to the third-party computing device based on the final output.

7. The system of claim 6, wherein the at least one hardware processor is further configured to:

generate a confidence score associated with the final output;

wherein, when communicating the response message to the third-party computing device based on the final output, the at least one hardware processor is configured to:

communicate the response message to the third-party computing device based on the final output, the response message comprising the confidence score.

8. A computer-implemented method, comprising:

generating, with at least one processor, a user profile based on identification data of a user, wherein generating the user profile comprises:

inputting the identification data to a generative machine learning model;

generating a plurality of abstracted datasets based on a plurality of outputs of the generative machine learning model, each abstracted dataset of the plurality of abstracted datasets based on a diffuser of a plurality of diffusers, and each diffuser of the plurality of diffusers comprising a different set of hyperparameters defining how the generative machine learning model interprets the identification data to generate an output; and associating the plurality of abstracted datasets with the user profile;

receiving, with at least one processor, a request message from a third-party computing device, the request message comprising a query and a token, the token associated with the user profile;

determining, with at least one processor, the user profile based on the token;

generating, with at least one processor, a plurality of outputs based on the query and the plurality of abstracted datasets associated with the user profile, each output of the plurality of outputs based on an abstracted dataset of the plurality of abstracted datasets; and communicating, with at least one processor, a response message to the third-party computing device based on the plurality of outputs.

9. The computer-implemented method of claim 8, wherein generating the user profile further comprises:

receiving the identification data from a merchant system in response to the user scanning an identification device at a point-of-sale device.

10. The computer-implemented method of claim 8, wherein associating the plurality of abstracted datasets with the user profile comprises:

storing the plurality of abstracted datasets associated with the user profile in a database.

11. The computer-implemented method of claim 10, wherein determining the user profile based on the token comprises:

in response to receiving the token, querying the database to retrieve the user profile based on the token.

12. The computer-implemented method of claim 8, further comprising:

determining, with at least one processor, at least one outlier output from the plurality of outputs;

removing, with at least one processor, the at least one outlier output from the plurality of outputs; and normalizing, with at least one processor, the plurality of outputs to provide a final output.

13. The computer-implemented method of claim 12, wherein communicating the response message to the third-party computing device based on the plurality of outputs comprises:

communicating the response message to the third-party computing device based on the final output.

14. The computer-implemented method of claim 13, further comprising:

generating, with at least one processor, a confidence score associated with the final output;

wherein communicating the response message to the third-party computing device based on the final output comprises:

communicating the response message to the third-party computing device based on the final output, the response message comprising the confidence score.

15. A computer program product, comprising at least one non-transitory computer-readable medium including program instructions that, when executed by at least one processor, cause the at least one processor to:

generate a user profile based on identification data of a user, wherein the program instructions that cause the at least one processor to generate the user profile, cause the at least one processor to:

input the identification data to a generative machine learning model;

generate a plurality of abstracted datasets based on a plurality of outputs of the generative machine learning model, each abstracted dataset of the plurality of abstracted datasets based on a diffuser of a plurality of diffusers, and each diffuser of the plurality of diffusers comprising a different set of hyperparameters defining how the generative machine learning model interprets the identification data to generate an output; and associate the plurality of abstracted datasets with the user profile;

receive a request message from a third-party computing device, the request message comprising a query and a token, the token associated with the user profile;

determine the user profile based on the token;

generate a plurality of outputs based on the query and the plurality of abstracted datasets associated with the user profile, each output of the plurality of outputs based on an abstracted dataset of the plurality of abstracted datasets; and communicate a response message to the third-party computing device based on the plurality of outputs.

16. The computer program product of claim 15, wherein, the program instructions that cause the at least one processor to generate the user profile cause the at least one processor to:

receive the identification data from a merchant system in response to the user scanning an identification device at a point-of-sale device.

17. The computer program product of claim 15, wherein, the program instructions that cause the at least one processor to associate the plurality of abstracted datasets with the user profile cause the at least one processor to:

store the plurality of abstracted datasets associated with the user profile in a database.

18. The computer program product of claim 17, wherein, the program instructions that cause the at least one processor to determine the user profile based on the token cause the at least one processor to:

in response to receiving the token, query the database to retrieve the user profile based on the token.

19. The computer program product of claim 15, wherein the program instructions further cause the at least one processor to:

determine at least one outlier output from the plurality of outputs;

remove the at least one outlier output from the plurality of outputs; and normalize the plurality of outputs to provide a final output.

20. The computer program product of claim 15, wherein, the program instructions that cause the at least one processor to communicate the response message to the third-party computing device based on the plurality of outputs cause the at least one processor to:

communicate the response message to the third-party computing device based on the final output.

* * * * *